(12) United States Patent
Bennett, Jr. et al.

(10) Patent No.: US 7,085,770 B2
(45) Date of Patent: Aug. 1, 2006

(54) METHOD AND SYSTEM FOR GENERATING A FILE CONTAINING GRAPHICAL DISPLAYS FROM CONTENT STORED ON A COMPUTING NETWORK LOCATION

(75) Inventors: Carl O. Bennett, Jr., Marietta, GA (US); Flemming Boegelund, Frederikssund (DK); Bruce D. Chatman, Ho-ho-kus, NJ (US); Steven Earl Hicks, Coppel, TX (US)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 10/062,349

(22) Filed: Jan. 31, 2002

(65) Prior Publication Data

US 2003/0144998 A1 Jul. 31, 2003

(51) Int. Cl.
*G06F 17/00* (2006.01)
*G06F 7/00* (2006.01)

(52) U.S. Cl. .............................. 707/102; 707/10; 707/3
(58) Field of Classification Search .................... 707/3, 707/10, 101, 102; 715/513, 501.1; 709/218
See application file for complete search history.

(56) References Cited

U.S. PATENT DOCUMENTS

| | | | |
|---|---|---|---|
| 5,918,237 A * | 6/1999 | Montalbano ................ 715/513 |
| 5,963,945 A * | 10/1999 | Pal ............................. 707/10 |
| 6,405,222 B1 * | 6/2002 | Kunzinger et al. ...... 715/501.1 |
| 6,535,912 B1 * | 3/2003 | Anupam et al. ............ 709/217 |
| 6,654,785 B1 * | 11/2003 | Craig ......................... 709/203 |
| 6,654,786 B1 * | 11/2003 | Fox et al. ................... 709/203 |
| 6,665,657 B1 * | 12/2003 | Dibachi ........................ 707/3 |
| 2002/0032746 A1 * | 3/2002 | Lazaridis ................... 709/217 |
| 2002/0099784 A1 * | 7/2002 | Tran ........................... 709/212 |
| 2003/0016943 A1 * | 1/2003 | Chung et al. ................ 386/46 |
| 2003/0018746 A1 * | 1/2003 | Boesch ....................... 709/218 |
| 2003/0097361 A1 * | 5/2003 | Huang et al. ................ 707/10 |
| 2003/0135820 A1 * | 7/2003 | Aasman ..................... 715/500 |

* cited by examiner

*Primary Examiner*—John Breene
*Assistant Examiner*—Kuen S. Lu
(74) *Attorney, Agent, or Firm*—David A. Mims, Jr.; Darcell Walker

(57) ABSTRACT

A user compiling graphic slides for a presentation has the ability search or navigate through a presentation slide repository, select slides that the user desires, download the selected slides to a file at the location of the user and convert these slides into a slide presentation format using a slide program such as PowerPoint.RTM. In this method, the navigation and download slide steps can be performed in a browser on a computer network environment. The conversion and display function can be performed with software located in the user machine optionally in combination with server side software.

26 Claims, 7 Drawing Sheets

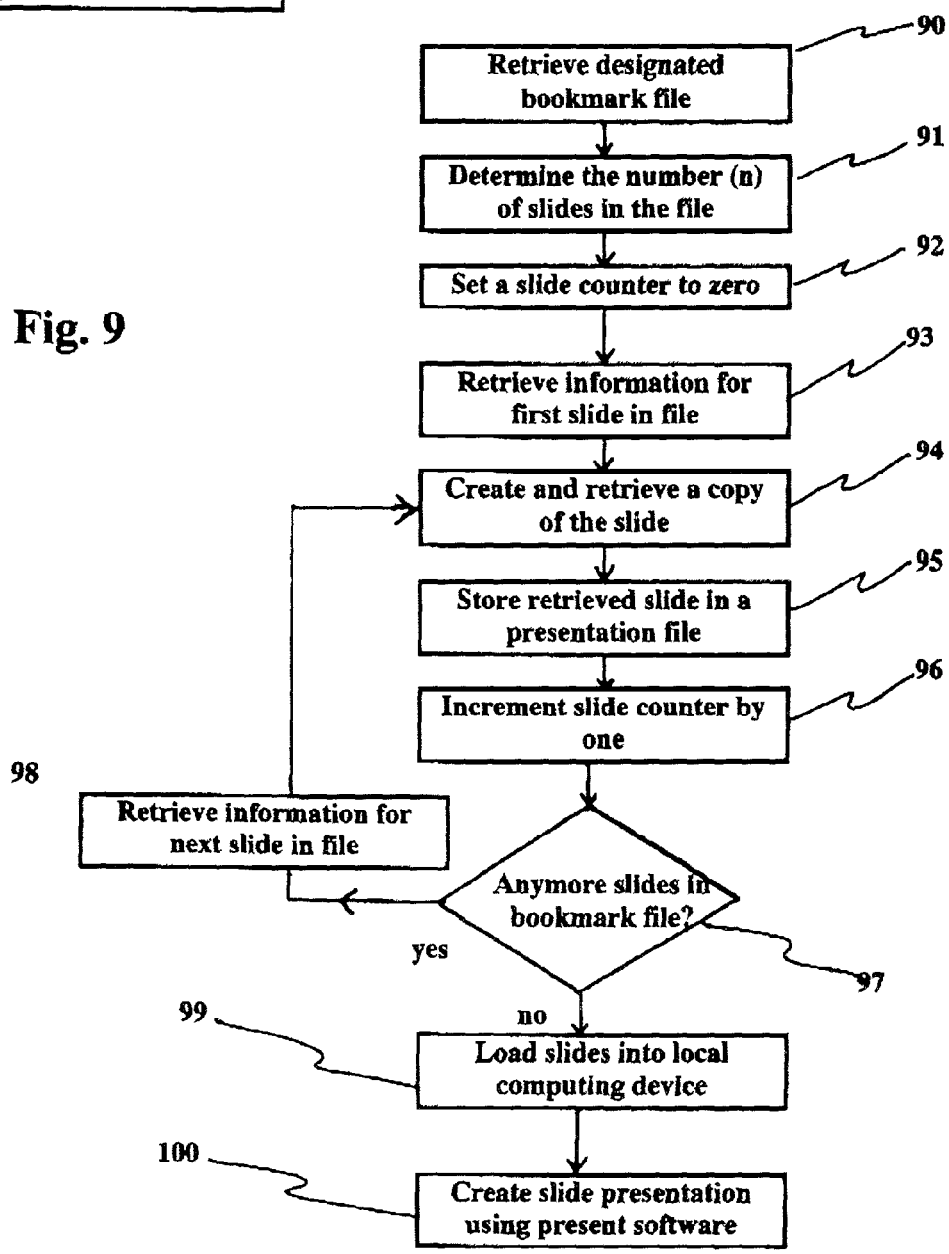

METHOD AND SYSTEM FOR GENERATING A FILE CONTAINING GRAPHICAL DISPLAYS FROM CONTENT STORED ON A COMPUTING NETWORK LOCATION

FIELD OF THE INVENTION

This invention relates to the creation of a file containing a series of graphical displays and in particular to a method and system for generating a graphical display file from content stored in a computing network environment location such as the Internet.

BACKGROUND OF THE INVENTION

The use of graphical displays and in particular presentation slides to convey information is an important part of the activities in many businesses and corporations. Executives make presentations to directors, managers conduct meetings with staff, salespersons make presentations to potential customers, doctors conduct meetings with nurses, lawyers make presentations to juries, and so on. A great many professionals conduct and attend meetings and presentations regularly. Much effort therefore goes into creating and delivering effective presentations and preparing for and conducting effective meetings.

With specialized software, conventional personal computers provide effective platforms for creating slides for use in conducting presentations and meetings. Currently available presentation program modules can turn a personal computer into a customized presentation system for creating and delivering slide presentations. Generally described, these presentation systems provide a specially designed, user-friendly, pallet of tools to assist in the creation of presentation slides to be subsequently displayed to an audience. These presentation systems also allow the slides to be sequentially presented to an audience, point-by-point and slide-by-slide, with color, animation, audio, and transition effects that enrich and enliven the presentation.

These slides used in presentations contain information related to the subject of the presentation and can include text, charts, graphs and pictorial images. Many of these slides are created on computers using various computer programs. Slide presentation programs are computer programs that enable a user to create, edit, manage, and perform "presentations" on a computer. One example of a popular slide presentation program is Microsoft PowerPoint®. A slide presentation includes a set of electronic "slides," each slide corresponding to one screen or page of output. An electronic slide may also be converted to a 35 mm slide or overhead transparency and displayed in a standard slide projector or overhead projector. Each slide contains one or more objects, such as text, graphical images, or graphical animation. A slide may also include a sound object that is played when the slide is displayed during a "slide show" performance.

A slide presentation software program "performs" a "slide show" by sequentially displaying a series of slides contained within the slide presentation. The slides are displayed on a display screen, which may be part of a computer monitor or a separate surface onto which an image is projected. During a performance of a slide show, a speaker controls the performance by invoking commands to advance the slide show. A command can be entered using a keyboard, a mouse, or other suitable input device. Alternatively, an author of a slide presentation can include slide "timings" with each slide. A slide timing corresponding to a slide indicates the number of seconds that the slide is displayed before the slide presentation program automatically advances to the next slide. During a performance of a slide show, the slide presentation program automatically advances to the next slide when the existing slide's timing ends.

A presentation slide can include one or more display objects that are incrementally displayed during a slide show. For example, a slide may initially appear with one bullet item. Sequential advancement of the slide show causes additional bullet items to be displayed. Display objects, such as bullet items, that are incrementally displayed are referred to as "builds." PowerPoint®. 95 provides an author with the ability to create and edit slides.

Presentation program resources have been developed to aid a user in developing a slide presentation. Each slide presentation contains a number of slides that display information, such as text, to an audience. In addition, each slide presentation can contain links to data (linked data) stored in an external source, such as a spreadsheet. The external source is referred to as a link source.

The creation of a slide presentation usually consists of generating original slides and compiling these new created slides into a new slide presentation. Although this method of slide creation has proven to be sufficient, many large organizations have departments with personnel in different physical locations that may conduct presentations on the same or similar subjects. In addition, many of these people may be located at different geographic locations. Furthermore, one person may want to include a slide from another person's slide presentation. There may be times when persons may want to share or exchange various presentation slides. To facilitate this exchange of slides, there can be a slide repository, from which users can search the repository, select slides, and incorporate the selected slides into the user's presentation. In addition, these repositories can be located in server computer on a computing network. At the present time, the slide presentation software has constraints on a user's ability to create slide presentations by downloading slides from other locations.

In many cases, the displays may be part of a larger set of displays. This situation is often seen with presentation slides. Slide presentations can contain multiple slides that are presented in a predetermined sequence. For example, a user can assume that a server stores a repository of 1,000,000 PowerPoint slides stored in the JPEG file format. As a user attempts to create a slide presentation with slides from this repository, the user may need to navigate through a large volume of slides in order to select the ones that the user desires for the presentation. The current method to perform this task is to manually review each slide and compile a set desired slides based on the review. For each desired slide, the user would need to display the slide on a screen, copy that slide and store the copy in a slide file in another location. This method of displaying and manually copying slides is tedious and inefficient. In addition, in large repositories, the user may not be able to return to the same location in the repository they were before downloading a particular slide.

In case a hotspot on a downloaded slide points to another slide that was also downloaded, this hotspot will still be active between the downloaded slides. In case a hotspot on a downloaded slide points to another slide that was not downloaded, this hotspot will still be active, but in this case the hotspot will cause the user's WebBrowser to launch and take the user to the slide in the described repository on the network.

There remains a need for a method and system that can enable a user to efficiently create a slide presentation or assembly a file of graphical displays from slides or displays stored in a slide repository that is located on a computing network environment.

SUMMARY OF THE INVENTION

It is an objective of the present invention to provide a method and system to create a file containing graphical displays from a collection of slides stored in a repository located at a remote location from a user, such as a site on a computing network.

It is a second objective of the present invention to provide a method and system to search for, select and download graphical displays from a computer network location containing a repository of graphical displays.

It is a third objective of the present invention to provide a method and system to compile presentation displays loaded from a display repository located on a computing network into a display presentation.

It is a fourth objective of the present invention to provide a method and system to access and transfer presentation displays from a display repository to a remote location over a computing network.

It is a fifth objective of the present invention to provide a method and system to convert a presentation display retrieved from a display repository to a format compatible with a presentation display software located in a remote computing machine.

In the context of slide presentations, the present invention provides a method and system to enable a user to create a slide presentation by searching, selecting, downloading and compiling slides from a central slide repository located on a computing network. A user may want to give a presentation on a subject for which there is a collection of slides currently stored on a computing network location such as a web server site on the internet. The user may not feel comfortable talking to an audience about the enormous number of slides that the site might have on a particular subject. Using the techniques of the present invention, a user can search, select, and download any number of slides from the slide repository to his/her local machine. A file containing the downloaded slides could then be assembled in a presentation program such as Power Point® in the order the slides were downloaded. The slides can also be re-arranged by the user. The user can create a custom presentation from the slides he/she previously downloaded. The actually assembling is done using a macro within a special program in the slide presentation software. This macro has a user interface that shows the user's current hard drive. After navigating to the folder where the files were downloaded, the macro will then place the slides with the presentation software, such as Power Point. These files are placed into the presentation software as jpeg images. The jpeg images are encoded with any url link information whether internal or external. Since the links are encoded with the image they will still be available once the files are assembled into the presentation software. The user can then interact with the new presentation like any other presentation adding text or images to the various slides.

The download of selected slides may also be performed in a more automatic way using server side programs that will automatically record the user's bookmarks of individual slides, then dowload these slides and finally automatically launch PowerPoint and bring the slides into PowerPoint.

The method of the present invention provides a user with the ability search or navigate through a presentation slide repository, select slides that the user wants, download the selected slides and convert these slides into a format of a presentation slide program such as PowerPoint®. In this method, the navigation and download slide steps can be performed in a browser environment. The conversion and display function can be performed with software located in the user machine with or without combination with server side software that automates the process. The navigation and download slide steps can also be performed in a non-browser computer application environment, then fully automated without need for server side software.

DESCRIPTION OF THE DRAWINGS

FIG. 8 is a flow diagram of the steps involved in the bookmark of selected slides step of the method illustrated in FIG. 4.

FIG. 9 is a flow diagram of the steps involved in the procedure to download selected slides to a created file for transfer to slide presentation software for processing.

DETAILED DESCRIPTION OF THE INVENTION

Figure 1:
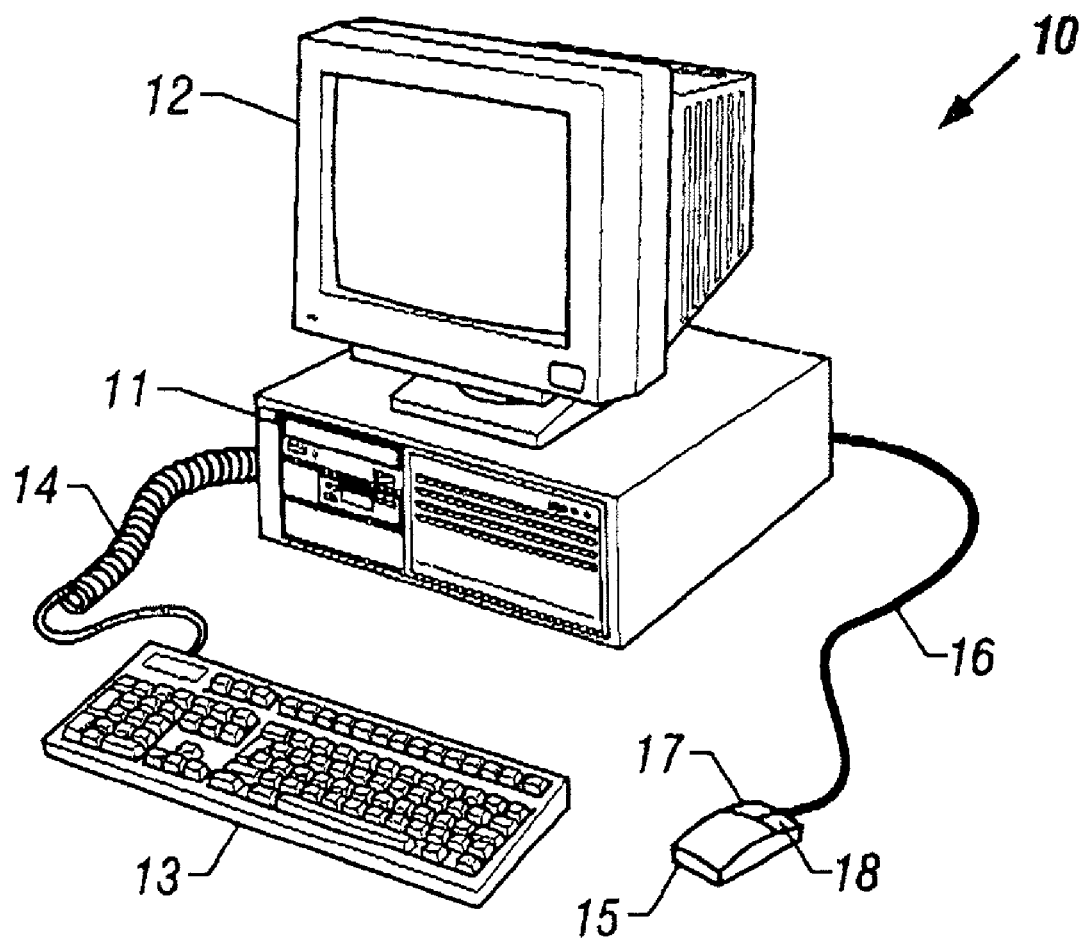
FIG. 1 depicts data processing equipment a system that can be utilized to implement the present invention.

In accordance with the present invention, a slide presentation program executes on a computer, preferably a general-purpose personal computer. FIG. 1 and the following discussion are intended to provide a brief, general description of a suitable computing environment in which the invention may be implemented. With reference now to FIG. 1, there is depicted a pictorial representation of data processing system 10 which may be used in implementation of the present invention. As may be seen, data processing system 10 includes processor 11 that preferably includes a graphics processor, memory device and central processor (not shown). Coupled to processor 11 is video display 12 which may be implemented utilizing either a color or monochromatic monitor, in a manner well known in the art. Also coupled to processor 11 is keyboard 13. Keyboard 13 preferably comprises a standard computer keyboard, which is coupled to the processor by means of cable 14. Also coupled to processor 11 is a graphical pointing device, such as mouse 15. Mouse 15 is coupled to processor 11, in a manner well known in the art, via cable 16. As is shown, mouse 15 may include left button 17, and right button 18, each of which may be depressed, or "clicked", to provide command and control signals to data processing system 10. While the disclosed embodiment of the present invention utilizes a mouse, those skilled in the art will appreciate that any graphical pointing device such as a light pen or touch sensitive screen may be utilized to implement the method and apparatus of the present invention. Upon reference to the foregoing, those skilled in the art will appreciate that data processing system 10 may be implemented utilizing a personal computer.

Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The personal computer may operate in a networked environment using logical connections to one or more remote computers, such as a remote computer. The remote computer may be another personal computer, a server, a router, a network PC, a peer device or other common network node, and typically includes many or all of the elements relative to a conventional personal computer. The logical connections depicted include a local area network (LAN) and a wide area network (WAN), Such networking environments are commonplace in offices, enterprise-wide computer networks, intranets and the Internet.

As mentioned, the method of the present invention may be implemented in a global computer network environment such as the Internet. With reference now FIG. 2, there is depicted a pictorial representation of a distributed computer network environment 20 in which one may implement the method and system of the present invention. As may be seen, distributed data processing system 20 may include a plurality of networks, such as Local Area Networks (LAN) 21 and 22, each of which preferably includes a plurality of individual computers 23 and 24, respectively. Of course, those skilled in the art will appreciate that a plurality of Intelligent Work Stations (IWS) coupled to a host processor may be utilized for each such network. Any of the processing systems may also be connected to the Internet as shown. As is common in such data processing systems, each individual computer may be coupled to a storage device 25 and/or a printer/output device 26. One or more such storage devices 25 may be utilized, in accordance with the method of the present invention, to store the various data objects or documents which may be periodically accessed and processed by a user within distributed data processing system 20, in accordance with the method and system of the present invention. In a manner well known in the prior art, each such data processing procedure or document may be stored within a storage device 25 which is associated with a Resource Manager or Library Service, which is responsible for maintaining and updating all resource objects associated therewith.

Figure 2:
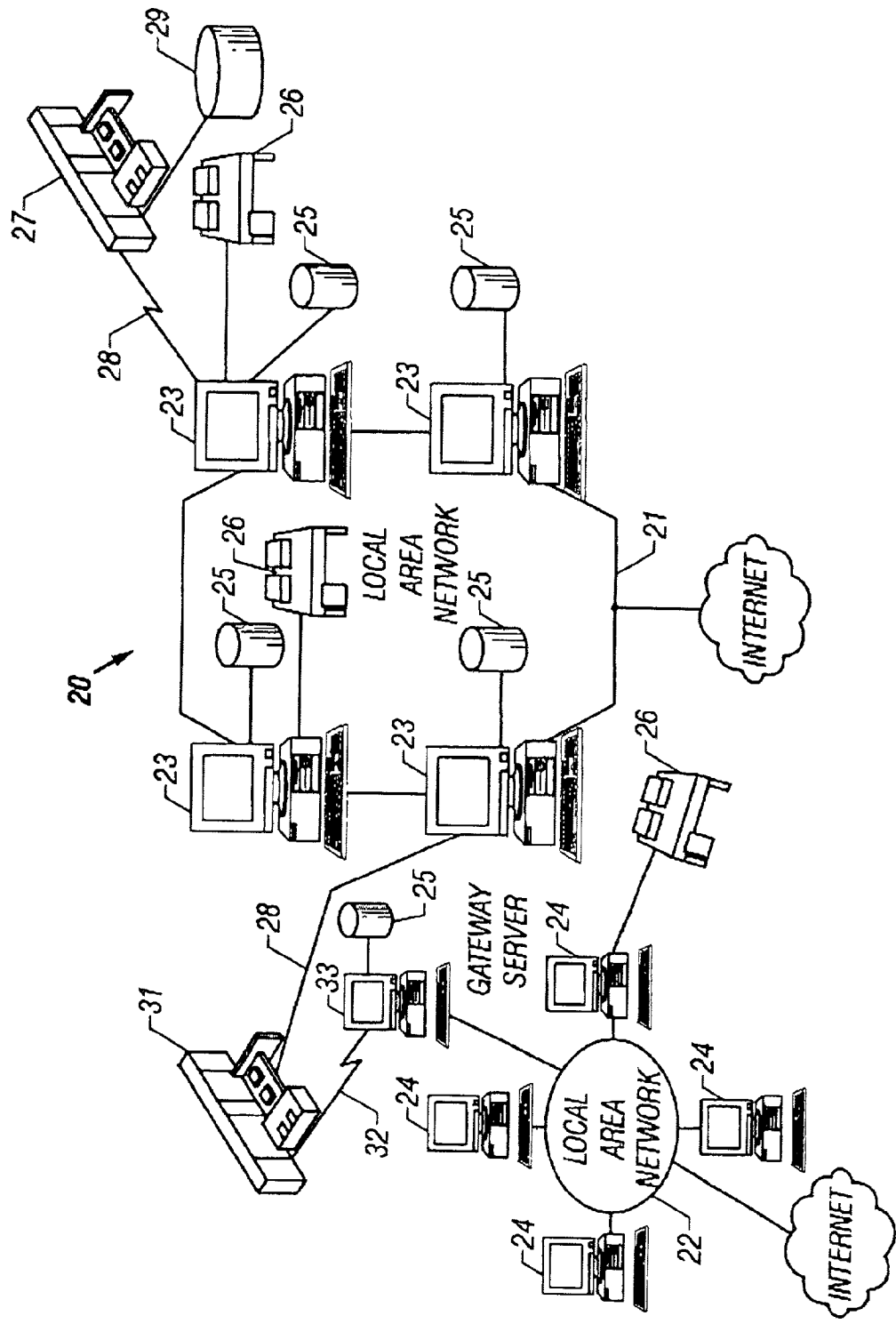
FIG. 2 is a diagram of a computer network over which messages and transactions may be transmitted.

Still referring to FIG. 2, it may be seen that distributed data processing system 20 may also include multiple mainframe computers, such as mainframe computer 27, which may be preferably coupled to Local Area Network (LAN) 21 by means of communications link 28. Mainframe computer 27 may also be coupled to a storage device 29 which may serve as remote storage for Local Area Network (LAN) 21. A second Local Area Network (LAN) 22 may be coupled to Local Area Network (LAN) 21 via communications controller 31 and communications link 32 to a gateway server 33. Gateway server 33 is preferably an individual computer or Intelligent Work Station (IWS) that serves to link Local Area Network (LAN) 22 to Local Area Network (LAN) 21. As discussed above with respect to Local Area Network (LAN) 22 and Local Area Network (LAN) 21, a plurality of data processing procedures or documents may be stored within storage device 29 and controlled by mainframe computer 27, as Resource Manager or Library Service for the data processing procedures and documents thus stored. Of course, those skilled in the art will appreciate that mainframe computer 27 may be located a great geographical distance from Local Area Network (LAN) 21 and similarly Local Area Network (LAN) 21 may be located a substantial distance from Local Area Network (LAN) 24. That is, Local Area Network (LAN) 24 may be located in California while Local Area Network (LAN) 21 may be located within Texas and mainframe computer 27 may be located in New York.

Figure 3:
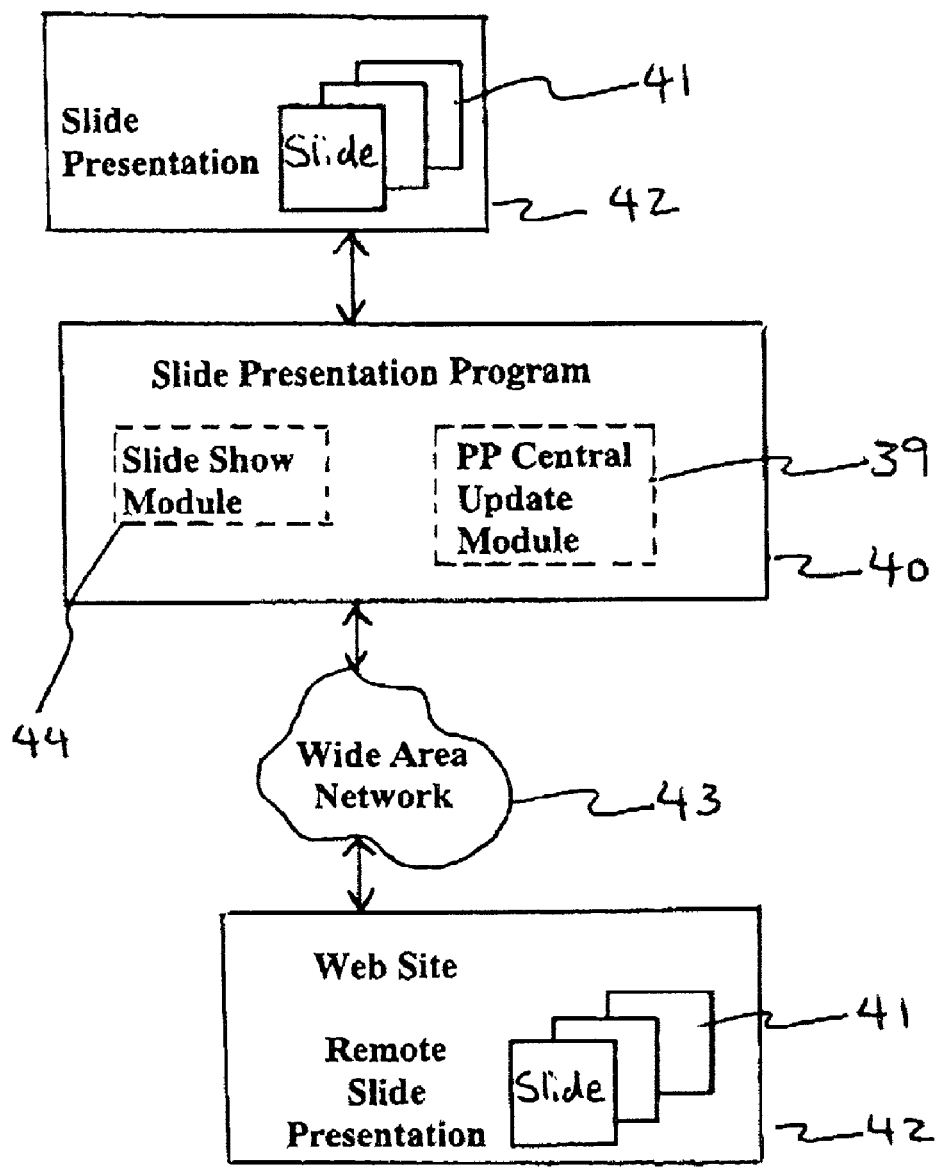
FIG. 3 is a diagram of the architecture of a slide presentation program that can be implemented in the present invention.

FIG. 3 illustrates an architecture of a slide presentation program 40 that can be used in the present invention. A slide is a discreet collection of information, including visual information such as text, graphic images, video, or animation. A slide may also comprise other information, including sounds and interactive information, such as hyperlinks. The slide presentation program 40 provides an author with the ability to create and edit a set of one or more "slides" 41 and to "present" or display one or more of the set of slides. The set of slides is referred to as a "slide presentation" 42. A slide presentation 42 is generally stored on a computer storage medium, such as a disk drive. The computer storage medium may be directly connected to the computer that performs a sideshow, or it may be connected to a remote computer on a local area network (LAN) or a wide area network (WAN) 43, such as the Internet.

The slide presentation program 40 includes a slide show module 44 that contains program code for controlling an electronic slide show. During an electronic slide show, the slide show module 44 retrieves a slide 41 and displays the slide on an output medium, such as a display monitor. The slide presentation program 40 also includes a PPCentral update module 39 that controls updating of the Central slide presentation 42. The techniques and features of the present invention could be located in the Central update module 39.

Figure 4:
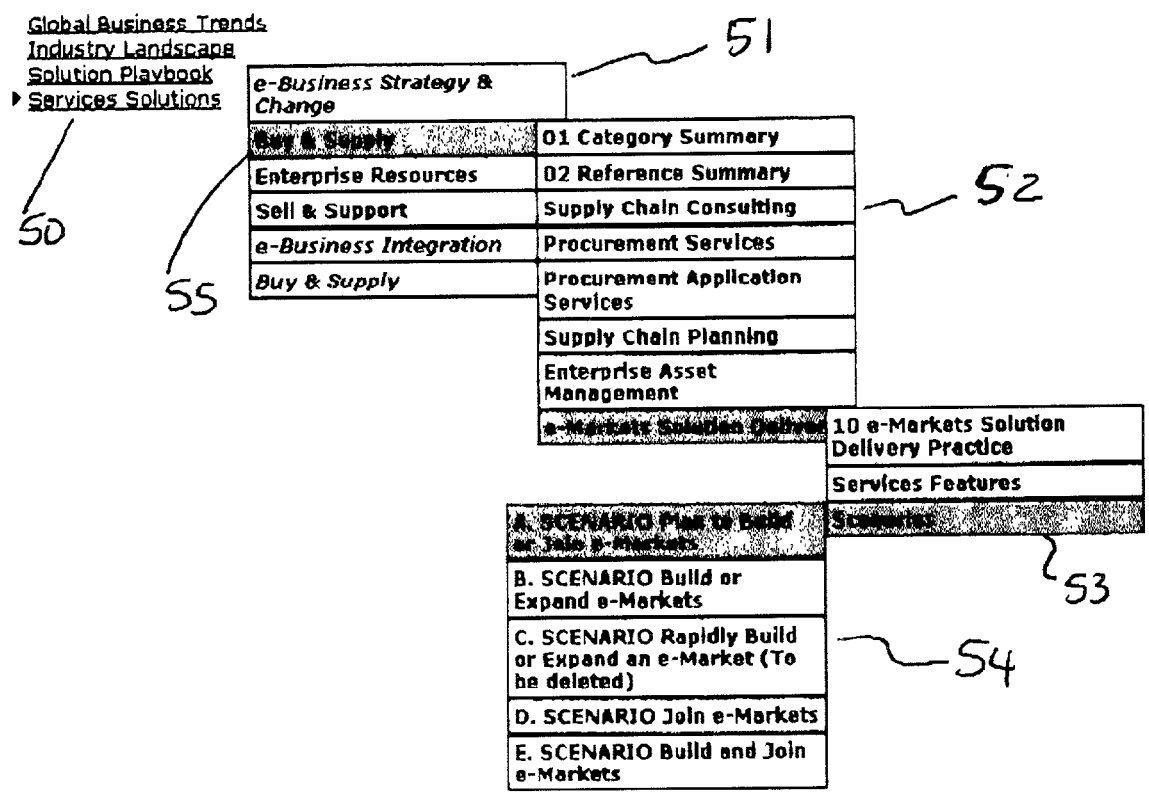
FIG. 4 is an illustration a graphical display repository directory.
Figure 5:
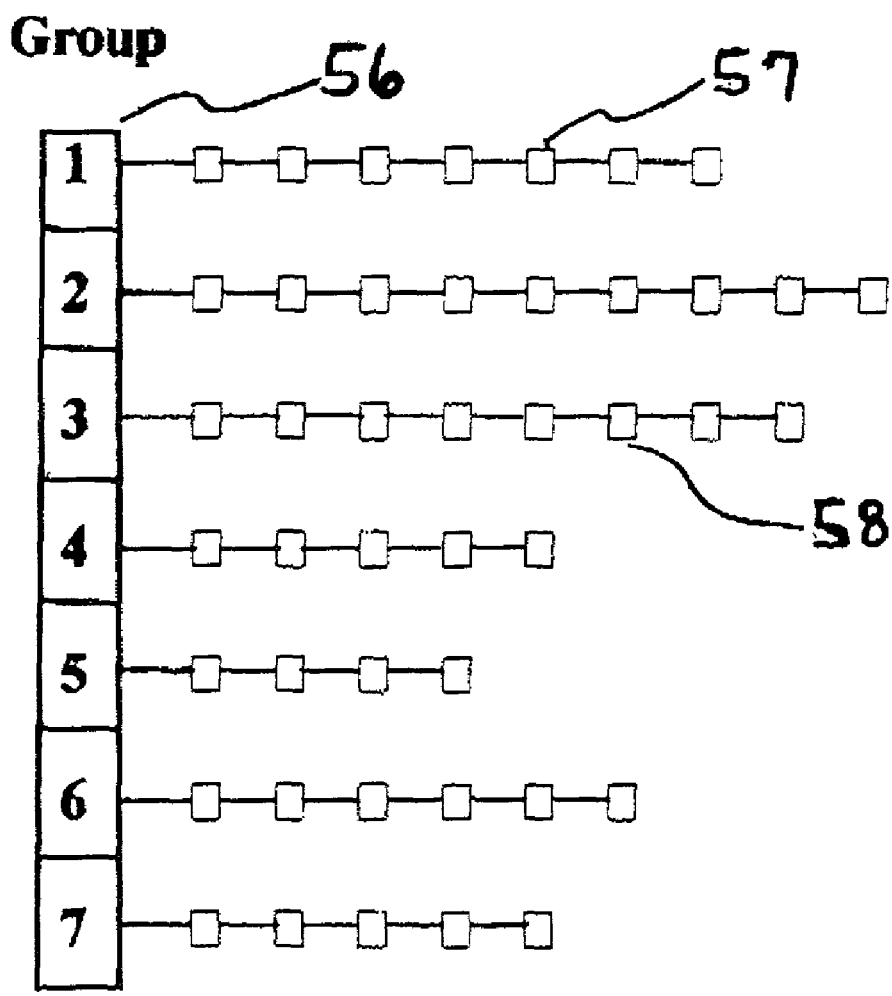
FIG. 5 is a diagram of a configuration of displays stored in a repository.

The description of the present invention will be done in the context of presentation slides. However, the techniques of the present invention can apply to any graphical displays stored in a repository. Referring to FIG. 4 there is a hierarchical configuration of a repository containing graphical displays. As shown, this hierarchical configuration has a main folder 50. The creation of this storage repository hierarchy along with the actual storage configuration of the slides is further described in disclosure AUS920010506, the contents of which are incorporated herein by reference. This folder contains the highest level of display categories. The displays in the repository fall under one of the folder categories. Each folder has a directory 51 with entries that describe the display categories. In this hierarchy, each entry in the main directory 51 contains a set of sub-directories 52. Each of these sub-directories contains a sub-directory 53. In FIG. 5, sub-directory 53 contains entries that are display set categories. These categories 54 are the locations for sets of displays. Each display in a set contains multiple graphical displays.

Referring to the main folder 50, folder category "Service Solutions" has a directory 55 titled "Buy and Supply". Each directory has links to a set of sub-directories 52. A directory can have fields containing pointers to the various sub-directories under that directory. For example, the "Buy and Supply" directory 55 links to eight sub-directories 52. These sub-directories have various titles that describe the contents of these sub-directories. Selecting the sub-directory titled "e-Market Solution Delivery" has links to yet another set of sub-directories. In this particular illustration, by selecting one of the entries in this last set of sub-directories 53, the user has reached the lowest point of the sub-directory hierarchy. The pointers from these sub-directories are to presentation slide sets. At this point, the user can access particular slide presentations related to the topic described in the directory title. The user will be able to select and view a graphical display. In this configuration, some sub-directories will more sub-directories than other sub-directories. The number of directories and sub-directories will depend on the number graphical displays for the topics under that general directory topic. The actual sets of graphical displays will be located at the end of the sub-directory string for the particular directory.

FIG. 5 illustrates a storage configuration for slide presentation in a slide repository. This configuration will enable a user to navigate through the slide repository in accordance with techniques described in a co-pending patent application of the same applicants of this invention, the contents of which are incorporated herein by reference. As shown, this configuration is a grid-type configuration that has a column 56 containing sets of slide presentations. Each slide presentation will have an identifier that points to a specific location in the repository. The illustration in FIG. 5 shows seven different slide presentations. Each slide presentation contains several slides 57. These slides are stored sequentially in the order that they would appear during an actual slide presentation. As shown, the number of slides in each presentation will vary. In addition, each slide will have an identifier that will indicate the slide presentation in which that slide belongs and the number of that slide in the sequence of slides in that presentation. In FIG. 5, slide 58 is the sixth slide in the third slide presentation. Therefore, this slide could have an identifier that has two fields to identify the particular slide. One field could contain a 3 indicating the third slide presentation. A second field could contain a 6 indicating the sixth slide in that presentation. Although each slide would some type of identifier, this information would generally not be accessible to the user.

Figure 6:
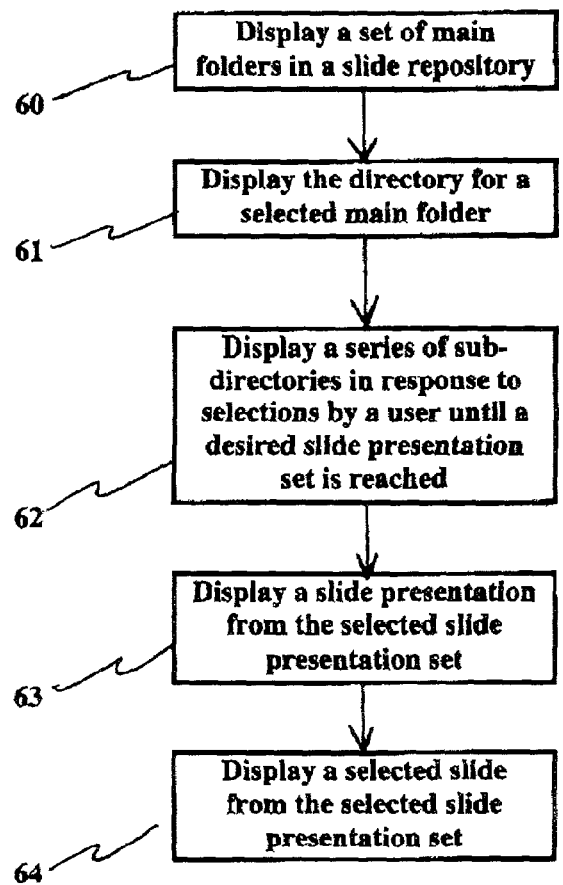
FIG. 6 is a flow diagram of the steps involved in the navigation to through the slide repository.

FIG. 6 illustrates the main steps in the method navigating through slide repository and selecting slides for a presentation. This navigation procedure is further described in disclosure number AUS920010505, the contents of which are incorporated herein by reference. In step 60, the main set of folders 50 is displayed to the user. As the user selects one of the categories from the main folder, the directory for that folder will appear on the screen in step 61. In step 62, series of sub-directories will appear as the user selects different categories from each sub-directory. As the user selects an entry from one sub-directory, another sub-directory for the selected entry will appear on the screen. This process will continue until the user reaches the slide presentation category level. At this point, the user can select a category containing a group of slide presentations. Once the user selects a slide presentation from the group, step 63 will display a row of buttons corresponding to the number of slides in that presentation. The user can move the curser over a button and view a thumbnail of the slide in step 64. The display can be the thumbnail view of the slide or a full screen view of the slide. At this point, the user can book mark the slide to designate the particular slide from the presentation as one that the user wants to incorporate in a new presentation.

Figure 7:
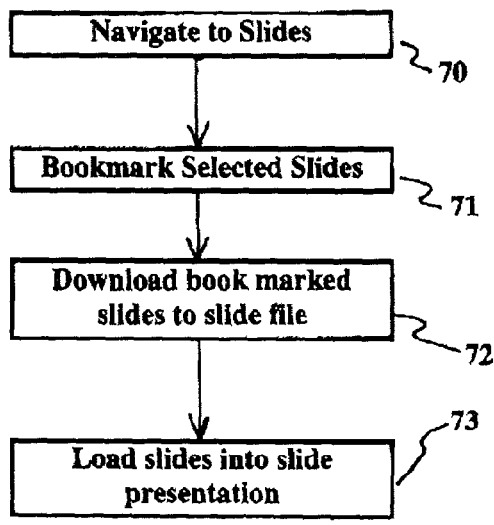
FIG. 7 is a flow diagram of the main steps for the implementation of the method of the present invention.

FIG. 7 shows the general steps to create a display file from selected slides in a slide repository. In step 70, the user navigates through the slide repository and selects slides for the presentation in accordance with the method described in FIG. 6. In step 71, the user will bookmark selected slides for inclusion in the slide file. When the user bookmarks a slide, information about the location of the slide is input into a bookmark file. This information will have the path in the repository to the identified slide. The information can be a series of designations indicating the main folder, directory, sub-directories, presentation category, presentation group, specific presentation and actual presentation slide. Because of the configuration of the repository, this information will enable the method of the present invention to navigate directly to the book marked slide.

Referring again to FIG. 7, step 72 retrieves the slides from the repository designated in the bookmark file created in step 71. Each retrieved slide can be copied and the copy stored in a slide file. The slides in this file will comprise the new presentation for the user. At this point, in step 73, this file containing the slides can be loaded into presentation software such as PowerPoint and converted into a slide presentation.

FIG. 8 shows the steps involved in book marking a slide for inclusion in a presentation. Step 80 retrieves the slide location information from the slide. This information is generated during the initial storing of the slide in the repository. In addition, this information is kept on the slide in a location that is transparent to the user but can be read by processing software. This information is read and stored in the book mark file in step 81.

FIG. 9 illustrates the steps involved in creating a file containing the slides book marked by the user. Step 90 retrieves the designated bookmark file that contains the identities of the book marked slides. The next step 91 is to initially count the number of entries in this book mark file. This number will assist in determining when there has been a retrieval of all of the slides corresponding to the entries in the file. Step 92 sets a counter to zero. Step 93 retrieves the identity of the first slide in the file. The next step 94 is to retrieve a copy of this slide from the location in the repository indicated in the slide identity information. The retrieved slide is stored in a newly created slide presentation file as indicated in step 95. Step 96 increments the number in the counter by one. At this point, there is a determination in step 97 whether the present entry is the last entry in the book mark file. This determination is made by comparing the current number in the counter to the number of slides determined in step 91. If the counter number is less than the predetermined number of slides, then step 92 retrieves the next entry in the bookmark file in step 98. At this point, the procedure returns to step 94 and repeats steps 94, 95, 96 and 97 for this book mark file entry. When the counter number is greater than the initial slide number in step 91, the process moves to step 99, where this presentation slide file is downloaded to the user's computing machine. In step 100, slide presentation software can convert this slide presentation into a form compatible for use with that presentation software.

It is important to note that while this invention was described in the context of slides as displays and slide presentations as display presentations, the navigations concepts and techniques of this invention can apply to any graphical displays stored in a repository in the configuration of a display repository illustrated in the present invention. It is also important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for creating a file containing graphical displays selected from a display repository on a computer network location comprising the steps of:
    initially creating a bookmark file for the selected display addresses;
    placing the address of selected display from the display repository in a bookmark file;
    determining whether the bookmark file is complete, by detecting a close file command;
    retrieving selected displays using the addresses contained in the bookmark file;
    loading the retrieved displays into a display file; and
    creating a custom slide display from the retrieved and loaded displays.

2. The method as described in claim 1 further comprising before said planing addresses in bookmark file step, the step of displaying the hierarchical information of the display repository on a viewer screen, the hierarchical display containing directories, sub-directories, categories of graphical display sets and display groups within the display sets.

3. The method as described in claim 2 wherein the repository hierarchical information display step further comprises: displaying a set of main folders in the display repository; displaying the directory for a selected main folder; and displaying a series of sub-directories in response to selections by a user until a desired display group is reached and selected.

4. The method as described in claim 3 further comprising displaying a selected display on a display screen.

5. The method as described in claim 4 further comprising the step of retrieving display address information contained in the selected display.

6. The method as described in claim 1 wherein said display loading step further comprises: creating a display file;
    retrieving the designated bookmark file;
    retrieving display address information from the designated bookmark file;
    locating displays corresponding to the display addresses in the bookmark file;
    retrieving a copy of each located display;
    storing the copy of the located display in the display file;
    repeating said display locating, copy retrieving and copy storing steps for each address in the bookmark file;
    sending complete display file to local computing device; and
    creating display presentation using graphical presentation tools.

7. The method as described in claim 6 further comprising alter said bookmark file retrieval step the steps of determining the number of address entries in the bookmark file and initially setting a display counter to zero.

8. The method as described in claim 7 wherein said repeating step further comprises the steps of:
    incrementing the display counter by one after storing each copy of a retrieved display;
    comparing die current number in the display counter with the determined number of addresses in the bookmark file; and
    returning to the locating the address for the next display in the bookmark file step, when the determined number addresses in the bookmark file is greater than the current number in the counter.

9. The method as described in claim 7 wherein said repeating step further comprises the steps of: incrementing the display counter by one after storing each copy of a retrieved display, comparing the current number in the display counter with the determined number of addresses in the bookmark file; and compiling displays in the display for transmission to a local computing device, when the determined number addresses in the bookmark file is not greater than the current number in the counter.

10. The method as described in claim 6 wherein said creating presentation step further comprises converting displays in the display from the format of the displays as stored in the repository to a format for display presentation.

11. A computer program product in a computer readable medium for creating a file containing graphical displays selected from a display repository on a computer network location comprising:
    instructions for initially creating a bookmark file for the selected display addresses;
    instructions for placing the address of selected display from the display repository in a bookmark file;
    instructions for determining whether the bookmark file is complete by detecting a close file command;
    instructions for retrieving selected displays using the addresses contained in the bookmark file;
    instructions for loading the retrieved displays into a display file; and
    instructions for creating a custom slide display from the retrieved and loaded displays.

12. The computer program product as described in claim 11 further comprising before said instructions for placing addresses in bookmark file, instructions for displaying the hierarchical information of the display repository on a viewer screen, the hierarchical display containing directories, sub-directories, categories of graphical display sets and display groups within the display sets.

13. The computer program product as described in claim 12 wherein the repository hierarchical information display instructions further comprise: instructions for displaying a set of main folders in the display repository; instructions for displaying the directory for a selected main folder; and instructions for displaying a series of sub-directories in response to selections by a user until a desired display group is reached and selected.

14. The computer program product as described in claim 13 further comprising instructions for displaying a selected display on a screen for view by a user.

15. The computer program product as described in claim 14 further comprising instructions for retrieving display address information contained in the selected display.

16. The computer program product as described in claim 11 wherein said display loading instructions further comprise:
    instructions for creating a display file; instructions for retrieving the designated bookmark file;
    instructions for retrieving display address information from the designated bookmark file;

instructions for locating displays corresponding to the display addresses in the bookmark file;

instructions for retrieving a copy of each located display;

instructions for storing the copy of the located display in the display file;

instructions for repeating said display locating, copy retrieving and copy storing instructions for each address in the bookmark file;

instructions for sending complete display file to local computing device; and instructions for creating display presentation using graphical presentation tools.

17. The computer program product as described in claim 16 further comprising alter said bookmark file retrieval instructions, instructions for determining the number of address entries in the bookmark file and instructions for initially setting a display counter to zero.

18. The computer program product as described in claim 17 wherein said repeating instructions further comprise:

instructions for incrementing the display counter by one after storing each copy of a retrieved display, instructions for comparing the current number in the display counter with the determined number of addresses in the bookmark file; and instructions for returning to the locating the address for the next display in the bookmark file instructions, when the determined number addresses in the bookmark file is greater than the current number in the counter.

19. The computer program product as described in claim 17 wherein said repeating instructions further comprise:

instructions for incrementing the display counter by one after storing each copy of a retrieved display;

instructions for comparing the current number in the display counter with the determined number of addresses in the bookmark file; and instructions for compiling displays in the display for transmission to a local computing device, when the determined number addresses in the bookmark file is not greater than the current number in the counter.

20. The computer program product as described in claim 16 wherein said creating presentation step further comprises converting displays in the display from the format of the displays as stored in the repository to a format for display presentation.

21. A system for generating a display file containing graphical displays stored in a repository at a computing network location comprising:

a display repository housed in a containing graphical displays, said displays being arranged into sets of displays and stored in said repository in a directory hierarchical tree configuration containing a series of sub-directories that link to the location of a display in said repository;

a local computing machine having the capability to create a bookmark file for selected display addresses;

a software program contained in said local computing machine capable of detecting whether a bookmark file is completed by detecting a close file command;

a computer network for establishing communication between said local computer and said display repository; and a display file generating program for assembling a display file from displays stored in a display file repository.

22. The system as described in claim 21 wherein said display repository resides in a server machine on said computer network.

23. The system as described in claim 21 further comprising a navigator program for maneuvering through the directories and sub-directories of graphical displays in the display repository.

24. The system as described in claim 23 further comprising a display presentation program for displaying the graphical displays in the generated display file on said local computer machine.

25. The system as described in claim 24 wherein said display presentation program further comprises a conversion program for converting displays from a format for staring the displays in the repository on the computing network to a format for displaying such displays on said local computing machine.

26. The system as described in claim 21 wherein said display file generating program further comprises: a module for creating a book mark file and storing addresses corresponding to the locations in the repository of the graphical displays in the book mark file; a module for creating a display file for storing copies of displays wit corresponding addresses stored in the book mark file; and a module for transmitting a display file over the computing network to a local computing machine.

* * * * *